United States Patent
Korus

(10) Patent No.: US 8,490,478 B2
(45) Date of Patent: Jul. 23, 2013

(54) TIRE PRESSURE SENSOR MOUNTING APPARATUS AND METHOD

(75) Inventor: Thomas J. Korus, Lindsay, NE (US)

(73) Assignee: Lindsay Corporation, Omaha, NE (US)

( * ) Notice: Subject to any disclaimer, the term of this patent is extended or adjusted under 35 U.S.C. 154(b) by 95 days.

(21) Appl. No.: 13/209,616

(22) Filed: Aug. 15, 2011

(65) Prior Publication Data

US 2013/0042676 A1   Feb. 21, 2013

(51) Int. Cl.
*G01M 17/02*   (2006.01)

(52) U.S. Cl.
USPC .......................................................... 73/146

(58) Field of Classification Search
None
See application file for complete search history.

(56) References Cited

U.S. PATENT DOCUMENTS

| | | | |
|---|---|---|---|
| 6,357,833 B1 | 3/2002 | Bajer | |
| 7,034,672 B2 | 4/2006 | Dinello et al. | |
| 7,040,365 B2 | 5/2006 | Lust | |
| 7,204,136 B2 * | 4/2007 | Thrush et al. | 73/146.2 |
| 7,246,518 B2 | 7/2007 | Ito et al. | |
| 7,309,110 B2 | 12/2007 | Vernet et al. | |
| 7,896,043 B2 | 3/2011 | Kashiwai et al. | |
| 2003/0209065 A1 * | 11/2003 | Fonteneau | 73/146.8 |
| 2006/0032299 A1 * | 2/2006 | Naidu et al. | 73/146 |
| 2006/0061463 A1 * | 3/2006 | Wilson, II | 340/447 |
| 2006/0130571 A1 * | 6/2006 | Thrush et al. | 73/146.2 |
| 2008/0110250 A1 * | 5/2008 | Jones | 73/146 |
| 2009/0134693 A1 | 5/2009 | Meggiolan et al. | |
| 2009/0134695 A1 | 5/2009 | Meggiolan | |
| 2009/0250994 A1 | 10/2009 | Meggiolan | |

* cited by examiner

*Primary Examiner* — Andre Allen

(74) *Attorney, Agent, or Firm* — Hovey Williams LLP

(57) ABSTRACT

A tire-pressure mount apparatus having a compartment in communication with a wheel and tire assembly. The compartment has a removable closure with a tire-pressure sensor and a valve stem mounted thereon so as to permit simultaneous removal of the tire-pressure sensor and valve stem when the closure is removed from the compartment, thus providing access thereto without requiring disassembly of the wheel and tire assembly.

10 Claims, 4 Drawing Sheets

TIRE PRESSURE SENSOR MOUNTING APPARATUS AND METHOD

BACKGROUND

1. Field

Embodiments of the present invention relate to a tire-pressure sensor mount apparatus and method that facilitate access to a tire-pressure sensor housed within a compartment of a wheel and tire assembly.

2. Discussion of Prior Art

Crops are cultivated throughout the world in a wide variety of climates with different terrains and soils. It is desirable in many of these climates to artificially supplement the climate's natural precipitation via irrigation systems to ensure crops receive adequate water. Additionally, irrigation systems can be used to deliver fertilizers and chemicals to, among other things, promote healthy crop growth, suppress weeds, and protect crops from frost.

To enable movement of irrigation systems through terrain that may be muddy and/or contain obstacles, it is necessary that the systems be equipped with large wheel and tire assemblies that are capable of supporting significant weight and traversing hazardous terrain. To ensure optimal performance of such wheel and tire assemblies, it is desirable to maintain an ideal tire pressure therewithin with any loss of tire pressure or leaks identified and repaired as soon as possible to minimize downtime of the system.

Some conventional wheel and tire assemblies include a tire-pressure monitor housed within the wheel and tire assemblies. Such tire-pressure monitors are occasionally damaged and often require maintenance and/or replacement more regularly than the wheel and tire assemblies. Such tire-pressure monitors, however, are only accessible after complete disassembly of the wheel and tire assembly. In view of the large size and weight of the wheel and tire assemblies utilized with irrigation systems, disassembly of such is particularly time consuming and burdensome, and may require heavy equipment to maneuver and service the wheel and tire assemblies.

Accordingly, there is a need for a tire pressure sensor mounting apparatus that facilitates servicing thereof with heightened efficiency so that any downtime of agricultural equipment used with the tire pressure sensor is minimized.

SUMMARY

The following brief summary is provided to indicate the nature of the subject matter disclosed herein. While certain aspects of the present invention are described below, the summary is not intended to limit the scope of the present invention. Embodiments of the present invention provide an irrigation system and method that does not suffer from the problems and limitations of conventional irrigation systems such as those set forth above.

The present invention provides, in its simplest form, a tire-pressure mount apparatus for a wheel and tire assembly of an irrigation system. The apparatus houses a tire-pressure sensor and permits selective removal thereof without requiring disassembly of the wheel and tire assembly.

The aforementioned aspects may be achieved in one aspect of the present invention by providing a tire pressure-sensor mount apparatus of a moveable irrigation system. The apparatus may include a compartment adjoined to a pressurizable wheel and tire assembly that is in communication with the assembly and operable to be simultaneously pressurized therewith. The apparatus may also include a closure mounted to the compartment that is configured to permit selective exposure of an interior of the compartment. The assembly wheel and tire assembly may include a pressurizable cavity that extends into the compartment.

The apparatus may include a valve stem operable to control pressurization of the pressurizable cavity. The valve stem may be mounted to the closure and may be operable to communicate fluid through the closure and to the pressurizable cavity. The apparatus may include a pressure sensor housed within the compartment that may be operable to sense an atmospheric pressure of the pressurizable cavity. The pressure sensor may be mounted to the closure. The closure may have an open configuration and a closed configuration, and may be operable to conceal an aperture in the compartment when in the closed configuration. The pressure sensor may be housed within the compartment. The pressure sensor and the interior of the compartment may be operable to be exposed via the aperture when the closure is in the open configuration. The enclosure may include a buffer. The apparatus may include a valve stem mounted to the closure such that the buffer substantially encloses the valve stem.

The aforementioned aspects may also be achieved in one aspect of the present invention by providing a method of mounting a tire pressure sensor to a moveable irrigation system. The method may include the step of adjoining a compartment to a pressurizable wheel and tire assembly with the compartment in communication with the assembly and operable to be simultaneously pressurized therewith. The method may also include the steps of housing a tire pressure sensor in the compartment and mounting a closure to the compartment with the closure configured to permit selective exposure of the tire pressure sensor. The assembly may include a pressurizable cavity that extends into the compartment, and the pressure sensor may be operable to sense an atmospheric pressure of the pressurizable cavity.

The method may further include the step of controlling pressurization of the pressurizable cavity via a valve stem. The method may further include the step of mounting a valve stem to the closure that may be operable to communicate fluid through the closure and to the pressurizable cavity. The pressure sensor may be mounted to the closure. The closure may have an open configuration and a closed configuration, and the closure may be operable to conceal an aperture in the compartment when in the closed configuration. The pressure sensor may be operable to be exposed via the aperture when the closure is in the open configuration. The closure may include a buffer.

The method may further include the step of mounting a valve stem to the closure such that the buffer substantially encloses the valve stem. The method may further include the steps of mounting a valve stem to the closure and mounting the tire pressure sensor to the closure so that the closure is selectively removable from the compartment simultaneously with the valve stem and the tire pressure sensor as a single unit.

The aforementioned aspects may also be achieved in one aspect of the present invention by providing a tire pressure-sensor apparatus for a tire and wheel assembly of a moveable irrigation system. The apparatus may include a housing having an internal cavity with a first opening on one side of the housing and a second opening on another side of the housing, and a cap assembly that may operable to close the first opening. The cap assembly may have a tire valve extending from an outer surface of the cap assembly and a tire-pressure sensor secured to an inner surface of the cap assembly. The tire-pressure sensor may be housed within the internal cavity when the first opening by the cap assembly so that the tire pressure sensor is operable to sense an atmospheric pressure within the internal cavity. The removal of the cap assembly from the housing may cause the tire valve and tire-pressure sensor to be simultaneously removed from the housing.

The second opening may define a pathway between the internal cavity and an external cavity. The pathway may be formed when the housing is mounted to a wheel and tire assembly. The valve stem may be operable to communicate fluid through the cap and to the internal cavity. The valve stem may be operable to pressurize the internal cavity and an external cavity. The internal cavity may be operable to be simultaneously pressurized with an external cavity. The cap may include a buffer. The buffer may substantially enclose the valve stem. The apparatus may further include a gasket between the cap and the housing. The gasket may be housed within grooves in the cap and/or the housing.

Additional aspects, advantages, and utilities of the present invention will be set forth in part in the description which follows and, in part, will be obvious from the description, or may be learned by practice of the present invention.

BRIEF DESCRIPTION OF THE DRAWINGS

Embodiments of the present invention are described in detail below with reference to the attached drawing figures, wherein.

Figure 1:
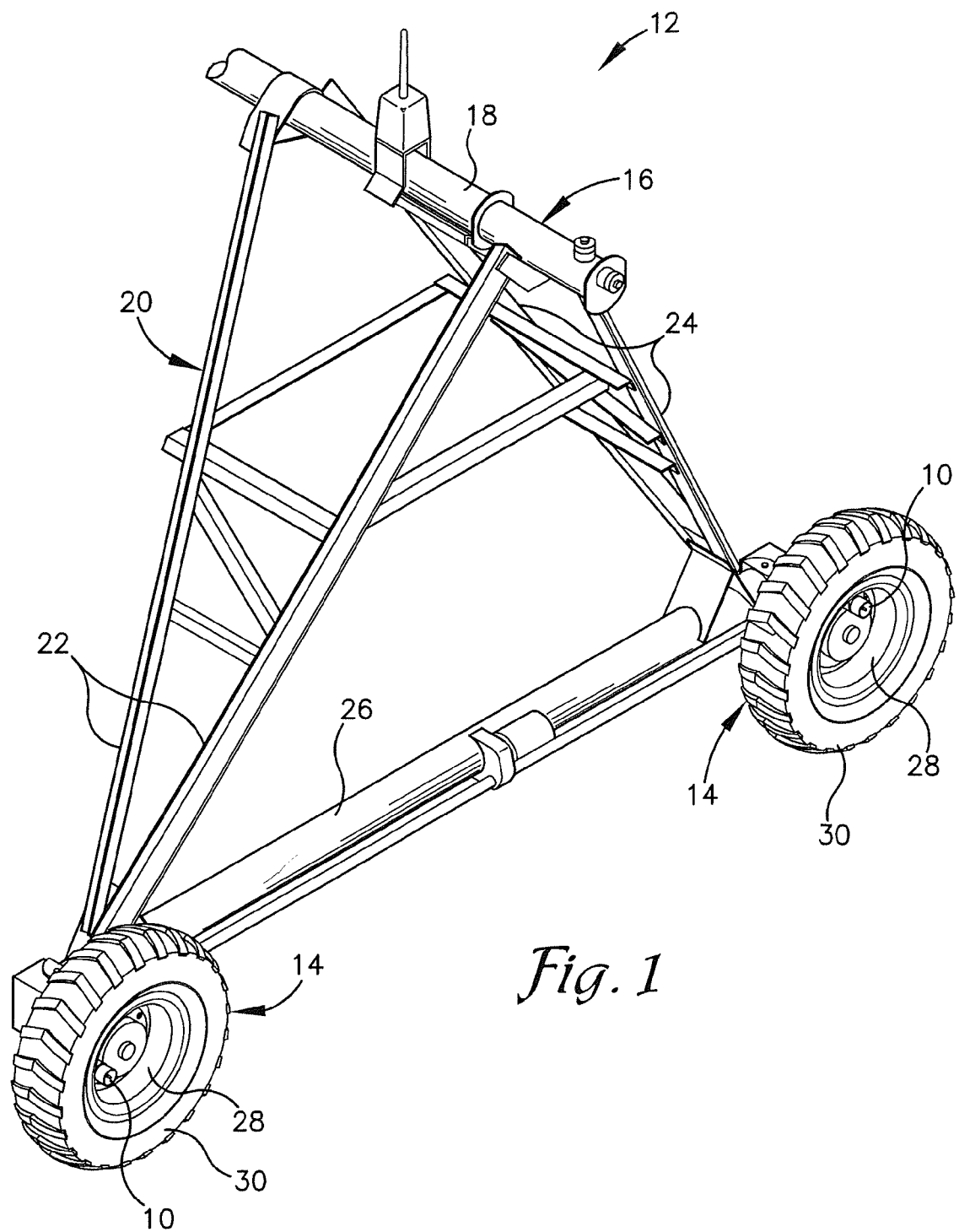
FIG. 1 is a rear right side perspective view of an end truss of a moveable irrigation system having a tire pressure sensor mounting apparatus, in accordance with an exemplary embodiment of the present invention.
Figure 2:
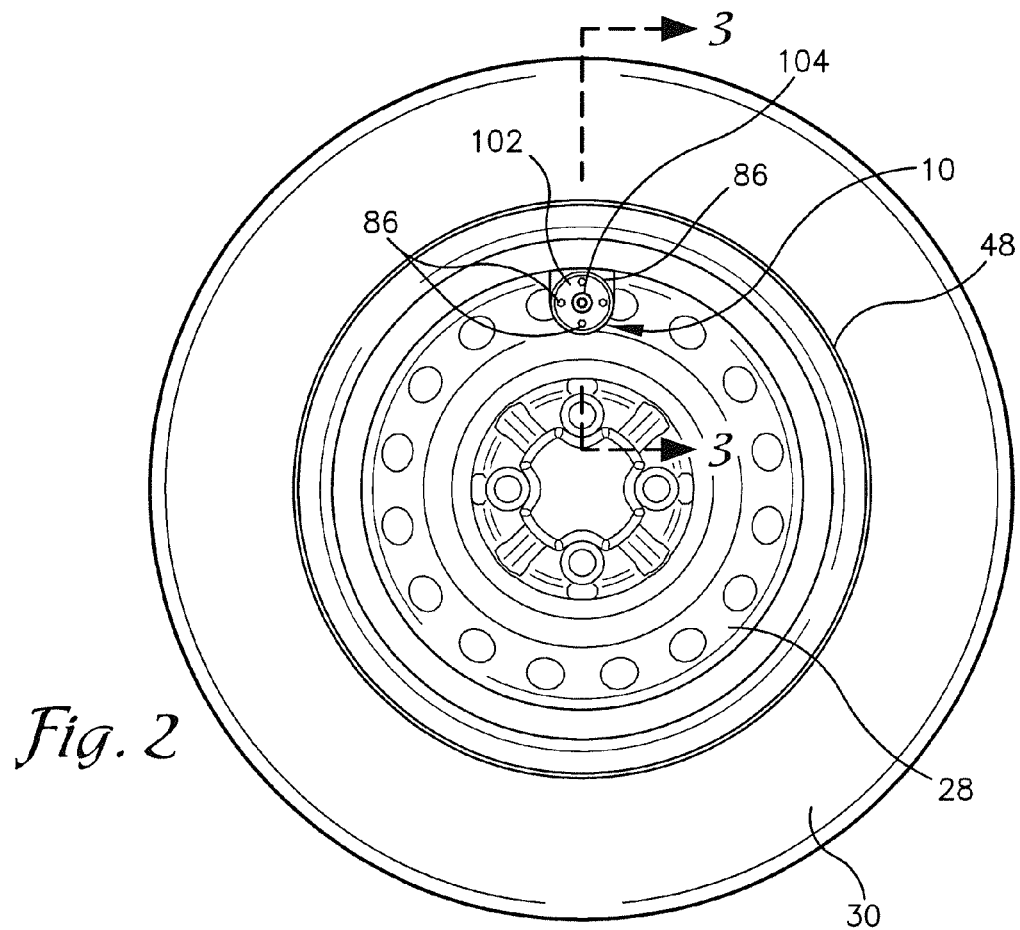
FIG. 2 is an elevated side view of a wheel and tire assembly of the system having the tire pressure sensor mounting apparatus illustrated in FIG. 1.
Figure 3:
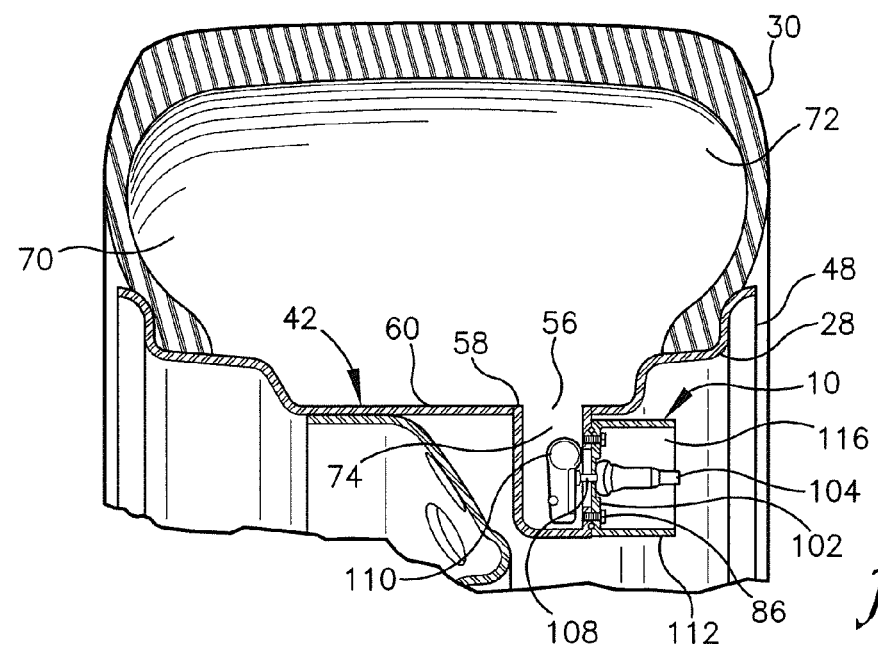
FIG. 3 is a vertical cross-sectional elevated rear view of the wheel and tire assembly of the system having the tire pressure sensor mounting apparatus along line 2-2 of FIG. 2.
Figure 4:
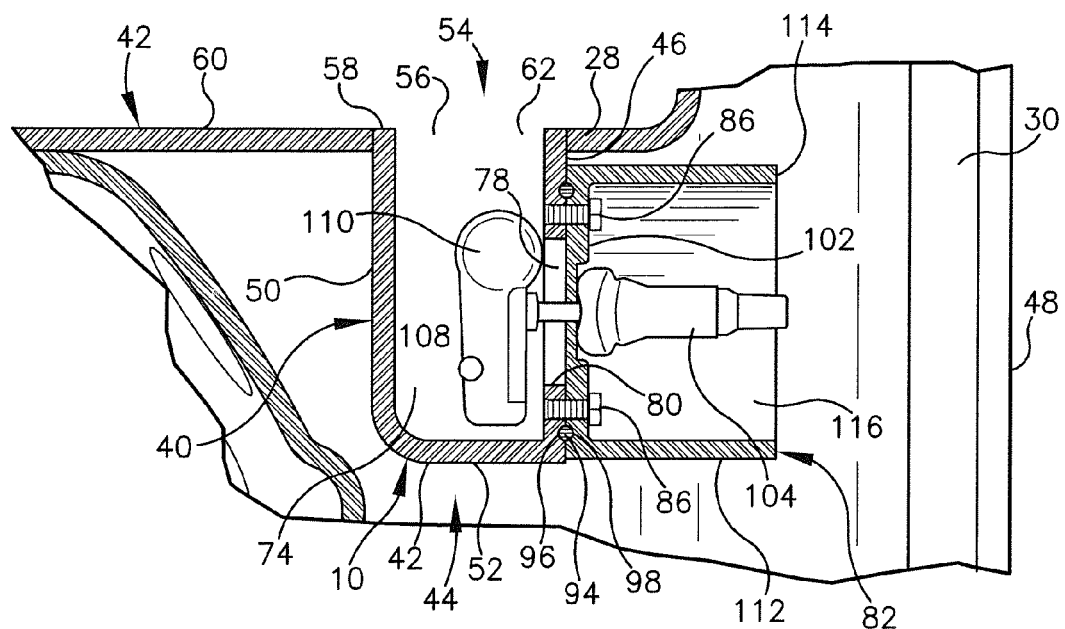
FIG. 4 is a magnified view of the tire pressure sensor mounting apparatus illustrated in FIG. 3.
Figure 5:
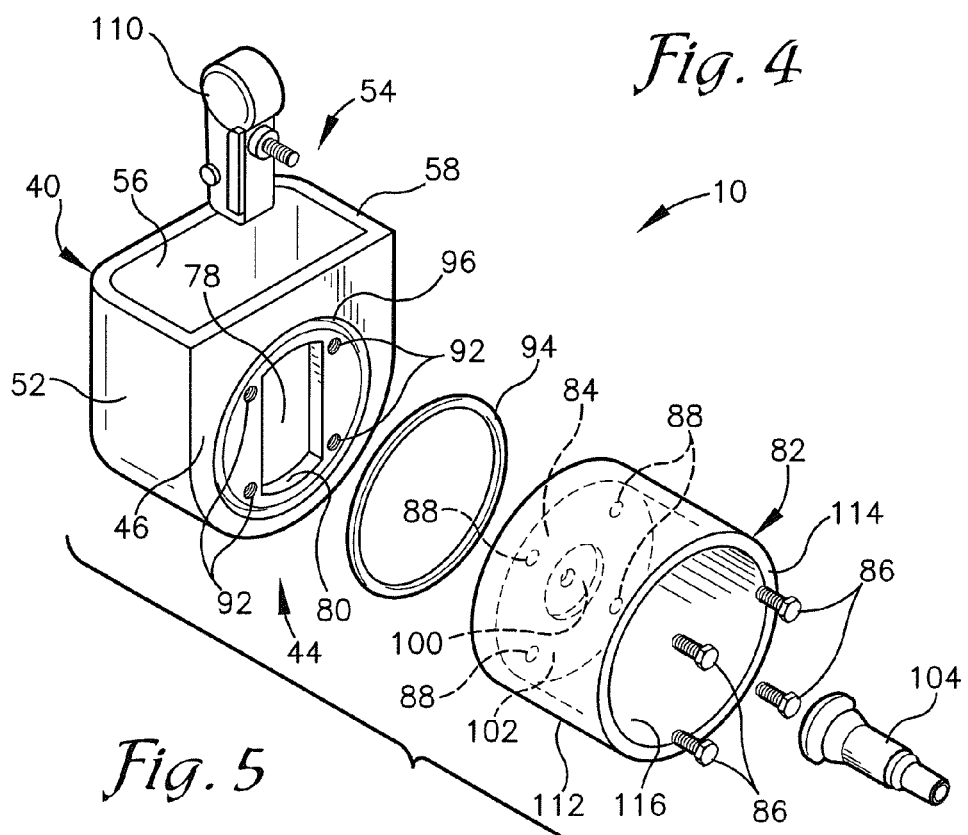
FIG. 5 is an exploded perspective view of the tire pressure sensor mounting apparatus illustrated in FIG. 1.

The drawing figures do not limit the present invention to the specific embodiments disclosed and described herein. The drawings are not necessarily to scale, emphasis instead being placed upon clearly illustrating the principles of the present invention.

DETAILED DESCRIPTION

The following detailed description of embodiments of the invention references the accompanying drawings. The embodiments are intended to describe aspects of the invention in sufficient detail to enable those skilled in the art to practice the invention. Other embodiments can be utilized and changes can be made without departing from the scope of the claims. The following detailed description is, therefore, not to be taken in a limiting sense. The scope of the present invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Turning now to the drawing figures, and particularly FIG. 1, a tire-pressure sensor mount apparatus 10, in accordance with embodiments of the present invention, is illustrated in use with a portion of a movable irrigation system 12. For purposes of describing aspects of the present invention, the tire-pressure sensor mount apparatus 10 is illustrated with a plurality of wheel and tire assemblies 14 of an end truss 16 of the movable irrigation system 12. It is foreseen, however, that the tire-pressure sensor mount apparatus 10 could be used with any movable structure having a wheel and tire assembly, such as, a cart of a lateral-move irrigation system and/or any truss between the cart and the end truss 16, without deviating from the scope of the present invention.

The truss 16 of the movable irrigation system 12 includes a distribution pipe or water-carrying conduit 18 for distributing fluid and/or solids suspended in fluids including fertilizers and pesticides (hereinafter "fluids") to crops in a field. The water-carrying conduit 18 is supported in an upright position by a tower structure 20 of the truss 16. The tower structure 20 includes arms 22, 24 secured to a common area along the water-carrying conduit 18 and depending therefrom to a base or "drive tube" 26 where the arms 22, 24 are laterally spaced from each other along the drive tube 26. Mounted to the ends of the drive tube 26 are the wheel and tire assemblies 14; each assembly having a wheel 28 and a tire 30. Additional details of the irrigation system 12, particularly with respect to the truss 16 are shown in U.S. patent application Ser. Nos. 13/042,192 and 13/043,138, which are hereby incorporated by reference in their entireties.

Turning to FIGS. 2-6, the tire-pressure sensor mount apparatus 10 is illustrated with a housing or compartment 40 adjoined to a sidewall 42 of the wheel 28 of the wheel and tire assembly 14. The compartment 40 is substantially rectangular with a rounded outer end 44. The compartment 40 includes a face wall 46 that is substantially parallel to a rim or face 48 of the wheel 28, a back wall 50 parallel and opposite to the face wall 46, and a side wall 52 that spaces the face wall 34 from the back wall 36. On an inner end 54 of the compartment 40, opposite to the rounded outer end 44, is a mouth 56 that is defined by a substantially rectangular perimeter edge 58. The perimeter edge 58 is cooperatively defined by the walls 46, 50, 52 and flush with an interior surface 60 of the wheel 28. The mouth 58 defines a pathway 62 between the compartment 32 and the wheel and tire assembly 14.

The wheel and tire assembly 14 and the compartment 40 cooperatively define a pressurizable cavity 70 having a wheel and tire assembly external cavity portion 72 and a compartment internal cavity portion 74. The cavity portions 72, 74 are in fluid communication with each other via the pathway 62. In this manner, the cavity portions 72, 74 may be simultaneously pressurized or depressurized, with pressurization or depressurization of one of the cavity portions 72, 74 causing the other of the cavity portions 72, 74 to be respectively pressurized or depressurized.

An aperture 78 is formed through the face wall 46 of the compartment 40 and has a perimeter edge 80. The aperture 78 is configured to be sealed or closed by a cap or closure 82. The closure 82 is selectively movable between an open configuration and a closed configuration with respect to the aperture 78. When the closure 82 is in the open configuration, the aperture 78 is open and access to an interior of the compartment 40, that is, the compartment cavity 74, is provided through the aperture 78. When the closure 82 is in the closed configuration, the aperture 78 is entirely closed by a rear wall 84 of the closure 82. The rear wall 84 is sized and shaped to extend over the aperture 78 and abut the face wall 46. In this manner, the closure 82 in the closed configuration causes the aperture 78 to be sealed by a seal cooperatively formed by the rear wall 84 of the closure 82 and the face wall 46 of the compartment 40.

The closure 82 is positioned in the closed configuration via a plurality of screws 86 that are each sized and shaped to extend through closure screw holes 88 in the rear wall 84 of the closure 82 and into threaded compartment screw holes 92. To ensure a tight seal between the face wall 46 of the compartment 40 and the rear wall 84 of the closure 82, a ring gasket 94 is provided therebetween. The gasket 94 is sized and shaped to fit respectively within annular grooves 96, 98 in the face wall 46 of the compartment 40 and the rear wall 84 of the closure 82 when the closure 82 is in the closed configuration.

A recess 100 is centrally formed in an outer surface 102 of the rear wall 84 of the closure 82. The recess 100 is sized and shaped to partially receive a valve stem 104 therein, which causes a portion of the valve stem 104 to be nested within the rear wall 84. A fluid aperture 106 extends through the rear wall 84 and is sized and shaped to securely receive a tube 108 extending from the valve stem 104 therethrough. The tube 108 allows the valve stem 104 to communicate fluid into and out of the pressurizable cavity 70.

Figure 6:
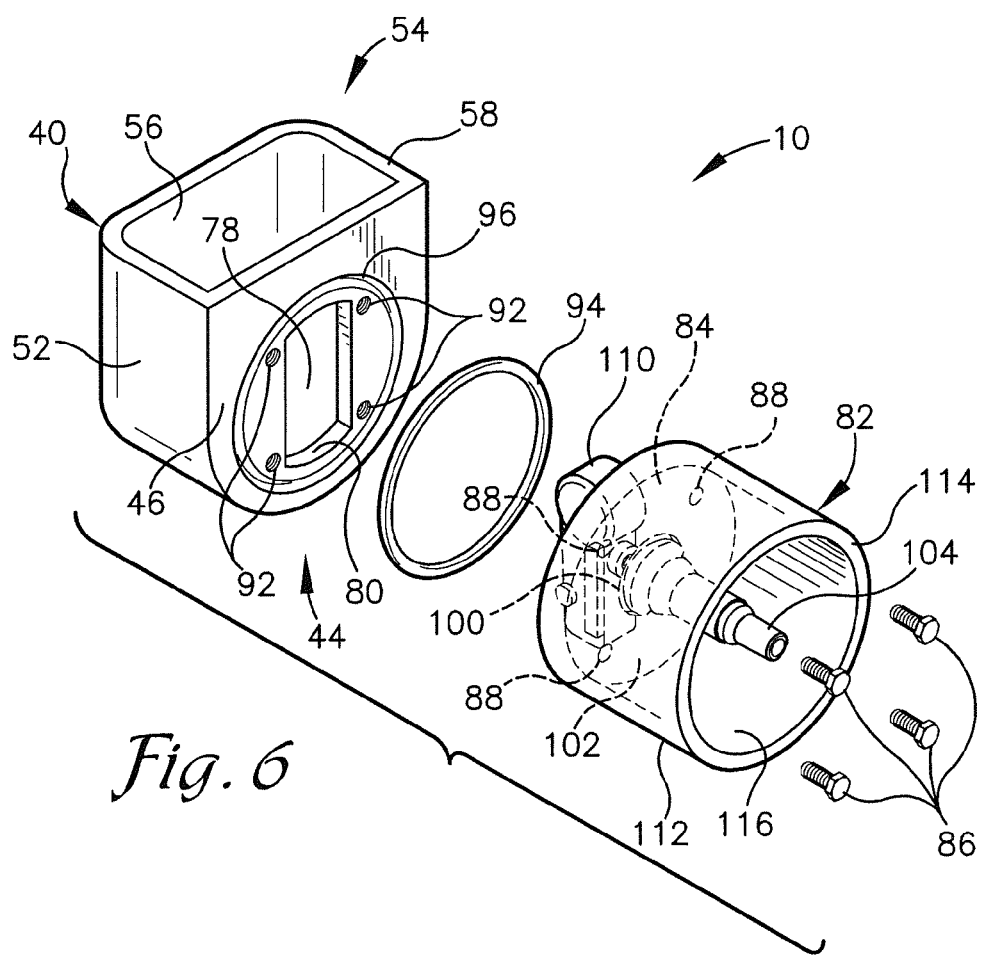
FIG. 6 is an exploded perspective view of the tire pressure sensor mounting apparatus illustrated in FIG. 1 similar to FIG. 5 illustrating a closure having a valve stem and a tire pressure sensor secured as a unit.

A tire-pressure sensor 110 is mounted to the valve stem 104 on an end of the tube 108, which orients the tire-pressure sensor 110 adjacent to an inner surface 112 of the rear wall 84. The tire-pressure sensor 110 is operable to measure atmospheric pressure of its surrounding environment and transmit the measured atmospheric pressure to a remote receiver. The tire-pressure sensor 110 and the valve stem 104 form a single unit with the closure 82 for simultaneous securement to and removal from the compartment 40 therewith, as illustrated in FIG. 6. When the closure 82 is converting from the open configuration to the closed configuration, the tire-pressure sensor 110 passes through the aperture 78 and into the compartment cavity 74 of the compartment 40 so that the tire-pressure sensor 110 is housed within the compartment 40 when the closure 82 is in the closed configuration and operable to measure atmospheric pressure of the pressurizable cavity 70.

Extending from the outer surface 102 of the closure 82 and about the valve stem 104 is a circumferential skirt 112. The skirt 112 extends perpendicular to the face wall 46 of the compartment 40 and the face 48 of the wheel 28 to an annular rim 114. The skirt 112 substantially encloses the valve stem 104 and forms a buffer with an open area 116 around between the skirt 112 and around the valve stem 104 to protect the valve stem 104 from foreign debris, tools, and other miscellaneous elements that may damage the valve stem 104. The skirt 112 additionally encloses and protects the screws 86 with the open area 116 configured to provide access to the screws 86 to enable conversion of the closure 82 to and from the open and closed configurations.

In use, the tire-pressure sensor mount apparatus 10 is mounted to the wheel and tire assembly 14, which is installed onto the movable irrigation system 12. The tire-pressure sensor mount apparatus 10 is configured with the closure 82 in the closed configuration so that the tire-pressure sensor 110 is positioned within the compartment 40. In this manner, the tire-pressure sensor mount apparatus 10 is operable to monitor and transmit atmospheric pressure of the pressurized cavity 70 to a remote receiver to be viewed by an operator of the movable irrigation system 12.

In the exemplary embodiment, the compartment 40 is manufactured with the wheel 28 of the wheel and tire assembly 14, with the pathway 62 formed in the wheel 28 and the compartment 40 mounted thereto via welding or the like. It is foreseen, however, that the compartment 40 could be retrofitted to a convention wheel without deviating from the scope of the present invention. For instance, it is foreseen that a pathway could be formed in a conventional wheel and the compartment 40 could be welded thereto, or an existing aperture in a convention wheel, e.g., a conventional tire-valve aperture, could be used in lieu of forming a pathway, and the compartment could be welded over the existing aperture.

During operation of the movable irrigation system 12, the remote receiver indicates whether the pressurized cavity 70 of the wheel and tire assembly 14 is of a sufficient atmospheric pressure or "tire pressure." Should the tire-pressure sensor 110 cease transmission of tire pressure or otherwise become faulty and require maintenance, the operator may efficiently inspect the tire-pressure sensor 110 by deflating the wheel and tire assembly 14, removing all of the screws 86, and removing the closure 82 from the compartment 40 or converting the closure 82 from the closed configuration to the open configuration. Upon removal of the closure 82 from the compartment 40, the tire-pressure sensor 110 is simultaneously removed from the compartment 40 and through the aperture 78 as a single-unit assembly thereby providing easy access thereto.

In this manner, the present invention provides an efficient method and apparatus operable to permit inspection and maintenance of the tire-pressure sensor 110 without requiring disassembly of the wheel and tire assembly 14, thus decreasing time consumed by maintenance operations and increasing productivity of the irrigation system 10. Although the present invention has been described with reference to the preferred embodiment illustrated in the attached drawing figures, it is noted that equivalents may be employed and substitutions made herein without departing from the scope of the present invention as recited in the claims.

Having thus described the preferred embodiment of the present invention, what is claimed as new and desired to be protected by Letters Patent includes the following:

1. A tire pressure-sensor mount apparatus for a wheel and tire assembly of a moveable irrigation system, the apparatus comprising:
   a compartment adjoined to the wheel and tire assembly, the compartment in communication with the wheel and tire assembly and operable to be simultaneously pressurized therewith; and
   a closure mounted to the compartment, the closure configured to permit selective exposure of an interior of the compartment.

2. The apparatus as set forth in claim 1, wherein the wheel and tire assembly includes a pressurizable cavity that extends into the compartment.

3. The apparatus as set forth in claim 2, further comprising:
   a valve stem operable to control pressurization of the pressurizable cavity.

4. The apparatus as set forth in claim 3, wherein the valve stem is mounted to the closure and is operable to communicate fluid through the closure and to the pressurizable cavity.

5. The apparatus as set forth in claim 2, further comprising:
a pressure sensor housed within the compartment, the pressure sensor operable to sense an atmospheric pressure of the pressurizable cavity.

6. The apparatus as set forth in claim 3, wherein the pressure sensor is mounted to the closure.

7. The apparatus as set forth in claim 1, wherein the closure has an open configuration and a closed configuration, and the closure is operable to conceal an aperture in the compartment when in the closed configuration.

8. The apparatus as set forth in claim 7, further comprising:
a pressure sensor housed within the compartment, the pressure sensor and the interior of the compartment are operable to be exposed via the aperture when the closure is in the open configuration.

9. The apparatus as set forth in claim 1, wherein the closure includes a buffer.

10. The apparatus as set forth in claim 9, further comprising:
a valve stem mounted to the closure such that the buffer substantially encloses the valve stem.

* * * * *